United States Patent
Futa et al.

(10) Patent No.: US 8,800,594 B2
(45) Date of Patent: Aug. 12, 2014

(54) GAS TURBINE ENGINE FUEL RETURN VALVE AND SYSTEM

(75) Inventors: Paul Futa, North Liberty, IN (US); Steven Alan Lewis, South Bend, IN (US); Larry Portolese, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 339 days.

(21) Appl. No.: 13/364,895

(22) Filed: Feb. 2, 2012

(65) Prior Publication Data

US 2013/0199630 A1 Aug. 8, 2013

(51) Int. Cl.
*F16K 31/12* (2006.01)

(52) U.S. Cl.
USPC ......... 137/492.5; 137/487.5; 137/625.4; 137/625.6; 137/625.68

(58) Field of Classification Search
USPC ......... 137/485, 487.5, 488, 492.5, 625.4, 137/625.6, 625.61, 625.64, 625.68, 625.38, 137/597; 60/741, 734, 39.8, 39.79, 39.81, 60/39.094, 39.281
See application file for complete search history.

(56) References Cited

U.S. PATENT DOCUMENTS

| | | | |
|---|---|---|---|
| 3,010,438 A * | 11/1961 | Fife et al. ............... | 137/625.66 |
| 4,117,765 A | 10/1978 | Paduch et al. | |
| 4,476,893 A * | 10/1984 | Schwelm ............... | 137/486 |
| 4,776,536 A | 10/1988 | Hudson et al. | |
| 5,186,213 A * | 2/1993 | Urata et al. ............ | 137/625.61 |
| 5,881,550 A | 3/1999 | Toelle | |
| 6,076,767 A | 6/2000 | Farley et al. | |
| 6,102,001 A | 8/2000 | McLevige | |
| 6,651,442 B2 | 11/2003 | Davies et al. | |
| 6,682,016 B1 | 1/2004 | Peroulakis | |
| 7,290,565 B2 * | 11/2007 | Achmad ............... | 137/625.61 |
| 7,607,285 B2 | 10/2009 | Futa, Jr. et al. | |
| 8,046,983 B2 | 11/2011 | Lawrence et al. | |
| 2010/0058733 A1 * | 3/2010 | Lawrence et al. ....... | 60/39.094 |
| 2010/0132368 A1 | 6/2010 | Lawrence et al. | |
| 2010/0223902 A1 | 9/2010 | Mailander et al. | |
| 2010/0251814 A1 | 10/2010 | Baker et al. | |

FOREIGN PATENT DOCUMENTS

GB 1516986 7/1978
WO 0120148 A2 3/2001

* cited by examiner

*Primary Examiner* — Craig Schneider
*Assistant Examiner* — Jessica Cahill
(74) *Attorney, Agent, or Firm* — Ingrassia Fisher & Lorenz, P.C.

(57) ABSTRACT

A fuel return valve and system includes a flow-level select and shut-off valve and a servo control valve. The flow-level select and shut-off valve includes a first fuel inlet, a second fuel inlet, a return-to-tank fuel outlet, and a valve element movable between a shut-off position, a mid-flow position, and a max-flow position. The servo control valve is coupled to the flow-level select and shut-off valve and is configured to control relative fluid pressures therein to selectively move the valve element to the shut-off position, the mid-flow position, and the max-flow position.

19 Claims, 4 Drawing Sheets

GAS TURBINE ENGINE FUEL RETURN VALVE AND SYSTEM

TECHNICAL FIELD

The present invention generally relates to gas turbine engine fuel controls, and more particularly relates to a fuel return valve for a gas turbine engine fuel control system.

BACKGROUND

In many aircraft, fuel is not only supplied to the gas turbine propulsion engines to propel the aircraft, but is also used for thermal management. That is, a portion of the fuel withdrawn from the fuel tanks may also be used to cool various components and lubrication oils, and then returned to the fuel tanks. The fuel in the aircraft fuel tanks is typically relatively cool (e.g., ambient temperature), whereas the fuel that has been withdrawn from the fuel tanks, pressurized by one or more pumps, directed through various fuel/oil coolers, equipment cooling circuits, fuel control bypass loops, and the like, is relatively hot (e.g., about 325° F.).

When the propulsion engines are operating at relatively low power conditions, burn flow rate of fuel may also be relatively low. In some instances, the relatively low burn flow rate may cause the fuel that is returned to the fuel tanks to be at a relatively high temperature. Regulatory authorities place limits on the temperature of fuel being returned to an aircraft fuel tank. Thus, some aircraft fuel supply systems include a plurality of valves to selectively mix relatively cool fuel with the relatively hot return fuel to lower its temperature before being returned to the fuel tank(s). Typically, to ensure proper operation across the operating range, both the mix of hot and cool fuel flows and the total fuel flow amount are accurately controlled to two different levels. Presently known configurations rely on a plurality of solenoids, which are used to position a metering valve to achieve the two required flow levels and to position a separate shut-off valve to achieve shutoff. This configuration also relies on two position sensors to enable valve position control and verification.

The presently known configurations for selectively controlling return fuel flow to a fuel tank are generally safe, reliable, and robust, but do exhibit certain drawbacks. For example, these configurations rely on multiple valves, multiple solenoids, and multiple position sensors, which can increase overall system cost and weight.

Hence, there is a need for a device that selectively controls return fuel flow to a fuel tank that does not rely on multiple valves, multiple solenoids, and multiple position sensors. The present invention addresses at least this need.

BRIEF SUMMARY

In one embodiment, a fuel return valve includes a flow-level select and shut-off valve and a servo control valve. The flow-level select and shut-off valve includes a first fuel inlet, a second fuel inlet, a return-to-tank fuel outlet, and a valve element movable between a shut-off position, a mid-flow position, and a max-flow position. The servo control valve is coupled to the flow-level select and shut-off valve and is configured to control relative fluid pressures therein to selectively move the valve element to the shut-off position, the mid-flow position, and the max-flow position. The flow-level select and shut-off valve is configured such that when the valve element is in the shut-off position, fuel is prevented from flowing into and through the first and second fuel inlet ports and out the return-to-tank outlet port. When the valve element is in the mid-flow position, fuel may flow into and through the first and second fuel inlets and out the return-to-tank outlet port at a first flow rate. When the valve element is in the max-flow position, fuel may flow into and through the first and second fuel inlets and out the return-to-tank outlet port at a second flow rate that is greater than the first flow rate.

In another embodiment, a fuel return valve includes a servo control valve and a flow-level select and shut-off valve. The servo control valve includes a servo fuel inlet, a servo fuel outlet, a first servo fuel control pressure port, and a second servo fuel control pressure port. The servo control valve is configured to selectively control relative fluid pressures at the first and second servo fuel control pressure ports. The flow-level select and shut-off valve includes first and second cold fuel inlet ports, first and second hot fuel inlet ports, a return-to-tank outlet port, a control pressure inlet port, a first control pressure port, a second control pressure port, and a valve element movable to at least a shut-off position, a mid-flow position, and a max-flow position. The control pressure inlet port is in fluid communication with the servo fuel inlet, the first control pressure port is coupled to and is in fluid communication with the first servo fuel control pressure port, and the second control pressure port is coupled to and is in fluid communication with the second servo fuel control pressure port. The flow-level select and shut-off valve is configured such that the valve element is in the shut-off position when the fluid pressure at the first servo fuel control pressure port is greater than the fluid pressure at the second servo fuel control pressure port, whereby the first and second cold fuel inlet ports and the first and second hot fuel inlet ports are both fluidly isolated from the return-to-tank outlet port. The valve element is in the mid-flow position when the fluid pressure at the first servo fuel control pressure port is equal to the fluid pressure at the second servo fuel control pressure port, whereby only the first cold fuel inlet port and only the first hot fuel inlet port are in fluid communication with the return-to-tank outlet port. The valve element is in the max-flow position when the fluid pressure at the first servo fuel control pressure port is less than the fluid pressure at the second servo fuel control pressure port, whereby both the first and second cold fuel inlet ports and both the first and second hot fuel inlet ports are in fluid communication with the return-to-tank outlet port.

In yet a further embodiment, a fuel return flow control system includes a servo control fuel source, a cold fuel return flow source, a hot fuel return flow source, and a fuel return valve in fluid communication with the servo control fuel source, the cold fuel return flow source, and the hot fuel return flow source. The fuel return valve includes an electrohydraulic servo control valve and a flow-level select and shut-off valve. The electrohydraulic servo control valve includes a servo fuel inlet, a servo fuel outlet, a first servo fuel control pressure port, and a second servo fuel control pressure port. The servo fuel inlet is in fluid communication with the servo control fuel source. The electrohydraulic servo control valve is configured to selectively control relative fuel pressures at the first and second servo fuel control pressure ports. The flow-level select and shut-off valve includes first and second cold fuel inlet ports, first and second hot fuel inlet ports, a return-to-tank fuel outlet port, a control pressure inlet port, a first control pressure port, a second control pressure port, and a valve element movable to at least a shut-off position, a mid-flow position, and a max-flow position. The control pressure inlet port is in fluid communication with the servo control fuel source, the first control pressure port is coupled to and is in fluid communication with the first servo fuel control pressure port, the second control pressure port is coupled to and is in fluid communication with the second servo fuel control pressure port, the first and second cold fuel inlet ports are in fluid communication with the cold fuel return flow source, and the first and second hot fuel inlet ports are in fluid communication with the hot fuel return flow source. The flow-level select and shut-off valve is configured such that the valve element is in the shut-off position when the fuel pressure at the first servo fuel control pressure port is greater than the fuel pressure at the second servo fuel control pressure port, whereby the first and second cold fuel inlet ports and the first and second hot fuel inlet ports are both fluidly isolated from the return-to-tank fuel outlet port. The valve element is in the mid-flow position when the fuel pressure at the first servo fuel control pressure port is equal to the fuel pressure at the second servo fuel control pressure port, whereby only the first cold fuel inlet port and only the first hot fuel inlet port are in fluid communication with the return-to-tank fuel outlet port. The valve element is in the max-flow position when the fuel pressure at the first servo fuel control pressure port is less than the fuel pressure at the second servo fuel control pressure port, whereby both the first and second cold fuel inlet ports and both the first and second hot fuel inlet ports are in fluid communication with the return-to-tank fuel outlet port.

Furthermore, other desirable features and characteristics of the fuel return valve and system will become apparent from the subsequent detailed description and the appended claims, taken in conjunction with the accompanying drawings and the preceding background.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
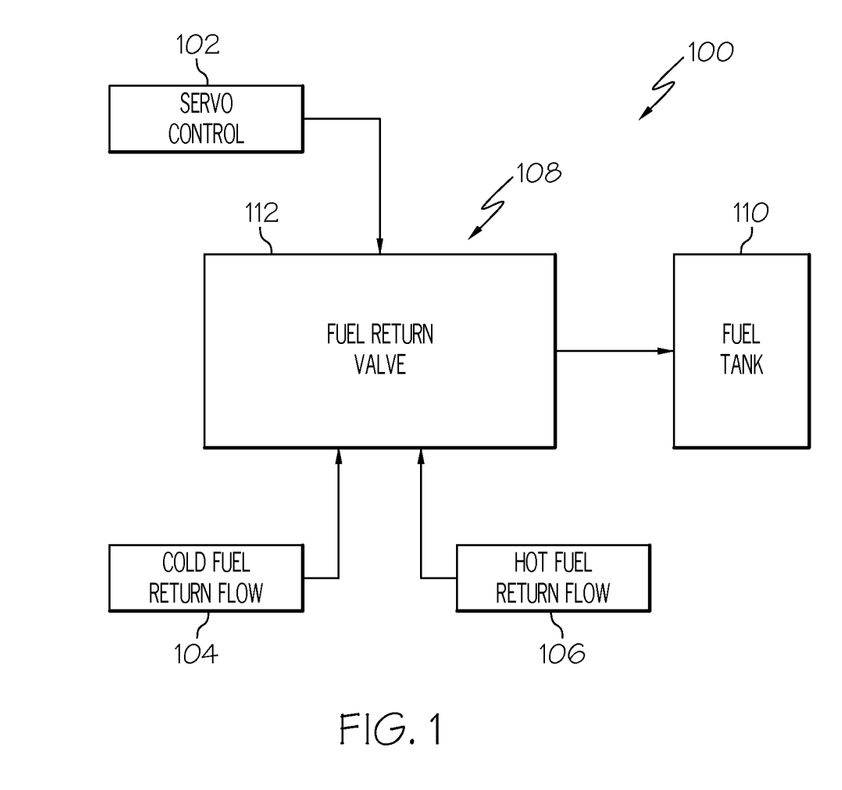
FIG. 1 is a simplified block diagram of an embodiment of at least a portion of a fuel return system.

Referring to FIG. 1, a functional block diagram of at least a portion of an embodiment of a fuel return flow control system 100 is depicted, and includes a servo control fuel source 102, a cold fuel return flow source 104, a hot fuel return flow source 106, a fuel return valve (FRV) 108, and a fuel tank 110. The servo control fuel source 102, the cold return fuel source 104, and the hot return fuel source 106 are depicted in simplified form in FIG. 1 because the specific location of these sources within an aircraft fuel supply system may vary. It is noted, however, that the cold fuel return source 104 and the hot fuel return source 106 are each in locations where the temperature of the fuel from the cold fuel return flow source 104 is lower than the fuel supplied from the hot fuel return flow source 106.

Figure 3:
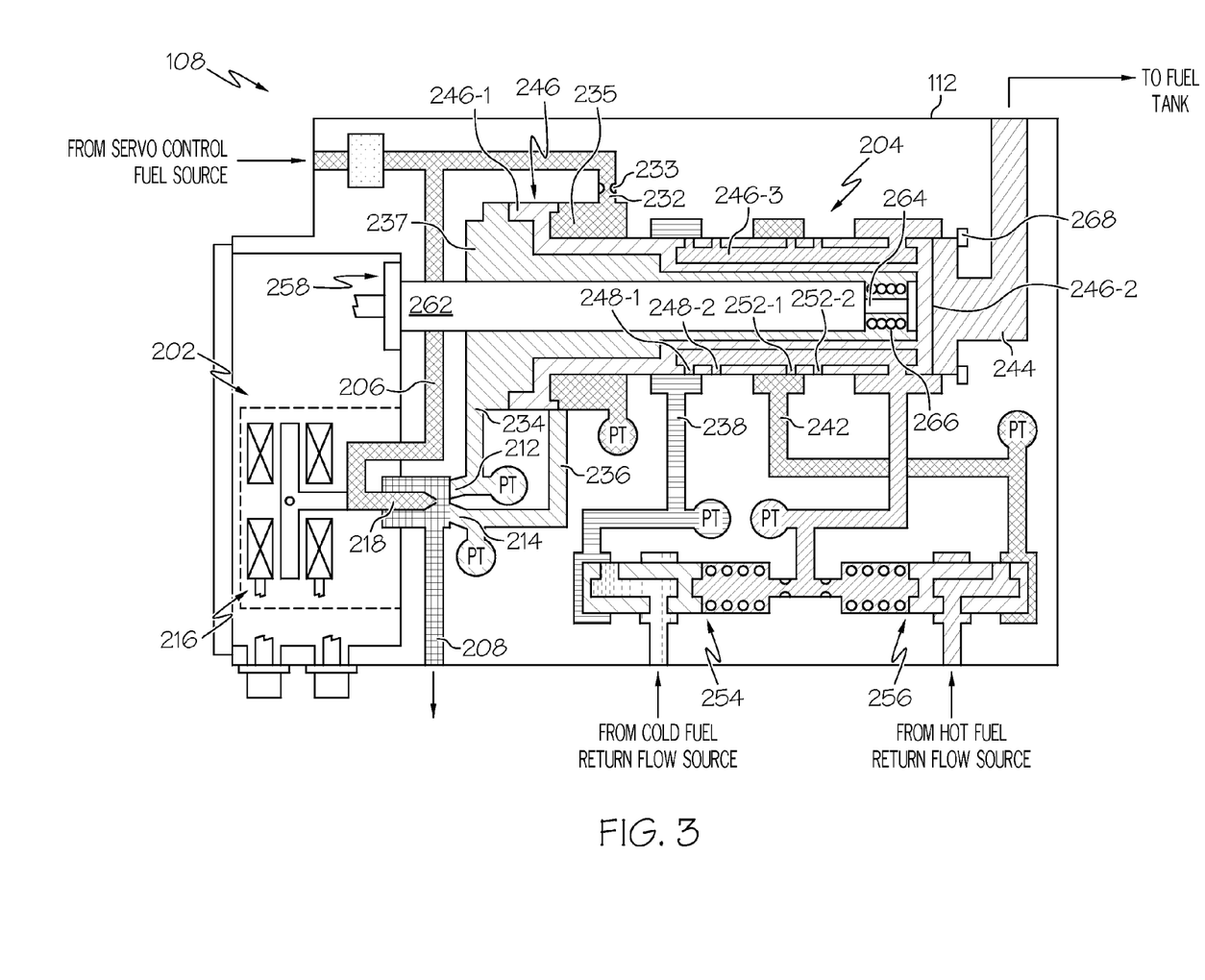
Figure 4:
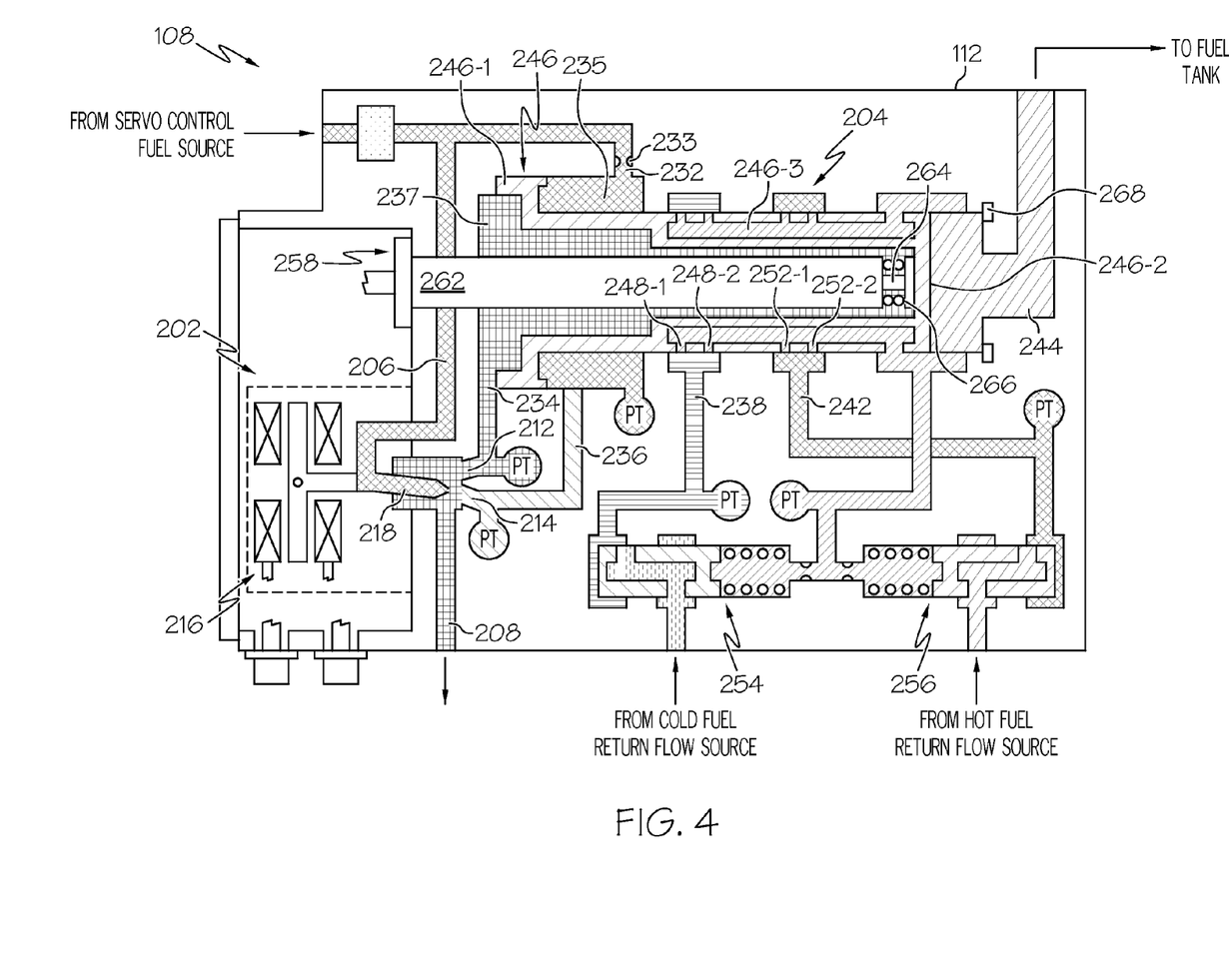

No matter the specific locations of the servo control fuel source 102, a cold fuel return flow source 104, a hot fuel return flow source 106, it is seen that the FRV 108 is in fluid communication with each of these source. The FRV 108 is also adapted to receive selectively supplied position commands from a non-illustrated source, and is configured, in response to the selectively supplied position commands, to be controllably moved to three different position—a shut-off position, a mid-flow position, and a max-flow position. As may be appreciated, in the shut-off position, no fuel flows through the FRV 108. In the mid-flow position, fuel flows out of the FRV 108 at a first flow rate, and the max-flow position, fuel flows out of the FRV 108 at a second flow rate that is greater than the first flow rate. As illustrated, the shut-off and dual-flow metering functionality of the FRV 108 is implemented into a single valve body 112. A particular configuration of the FRV 108 for implementing this functionality is depicted in FIGS. 2-4, and will now be described.

Figure 2:
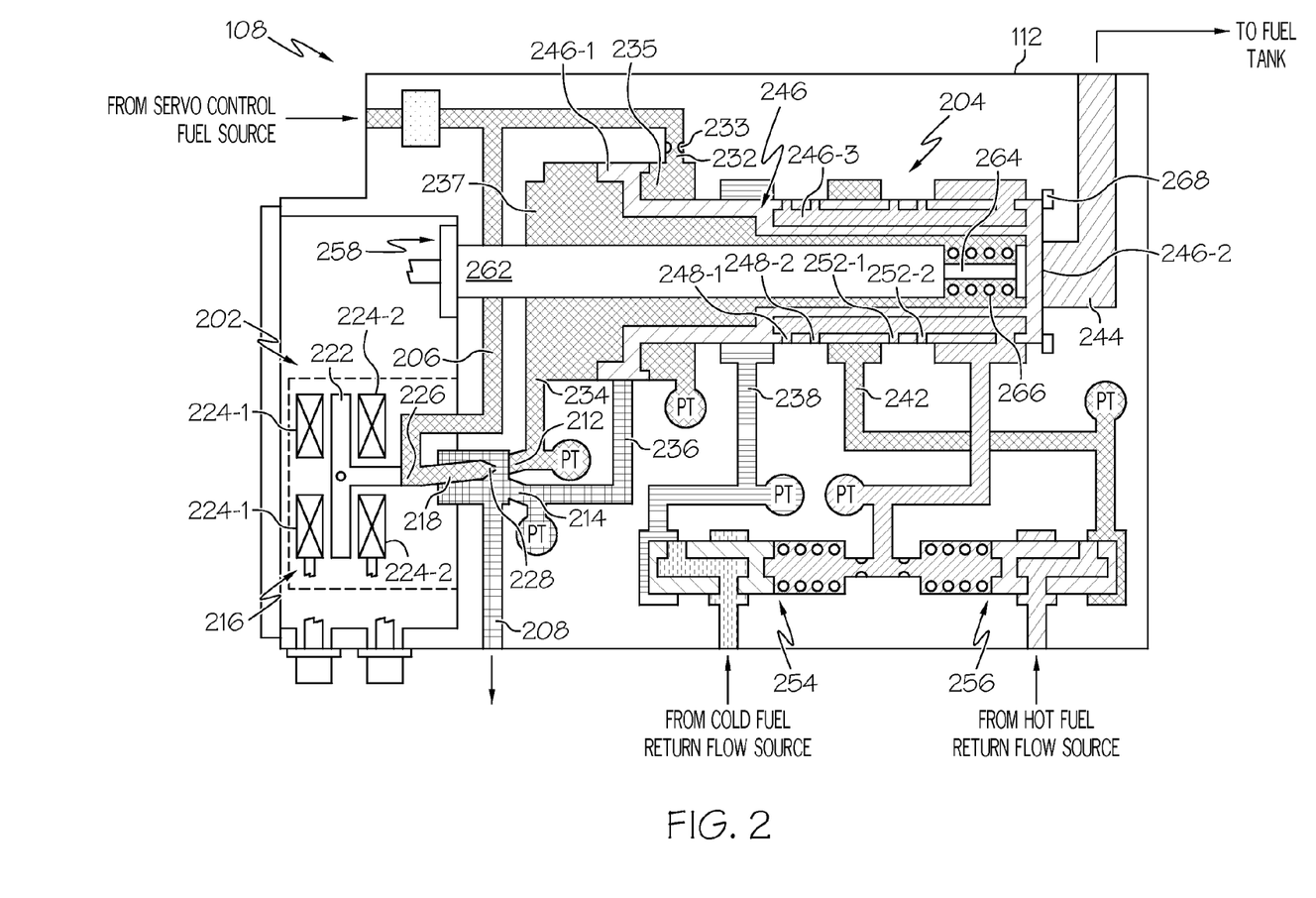
FIGS. 2-4 depict schematic representations of a fuel return valve in three different valve positions, and which may be implemented in the portion of the exemplary fuel return system depicted in FIG. 1.

Referring first to FIG. 2, the depicted FRV 108 includes a servo control valve 202 and a flow-level select and shut-off valve 204, disposed within the single valve body 112. The servo control valve 202 includes a servo fuel inlet 206, which is in fluid communication with the servo control fuel source 102. The servo control valve 202 additionally includes a servo fuel outlet 208, a first servo fuel control pressure port 212, and a second servo fuel control pressure port 214. The servo control valve 202 is configured, in response to the selectively supplied position commands described above, to selectively control the relative fuel pressures at the first and second servo fuel control pressure ports 212, 214.

The servo control valve 202 may be variously implemented and configured to carry out its functionality, but in the depicted embodiment the servo control valve 202 is implemented using a dual-channel electrohydraulic servo valve (EHSV). The EHSV 202 includes a dual-channel torque motor 216 and a jet pipe 218. The torque motor 216 includes an armature 222 and two sets of windings 224 (e.g., 224-1, 224-2). The armature 222 is coupled to the jet pipe 218, and the windings are each coupled to the source of the selectively supplied position commands. In most embodiments, only one set of the windings 224 will receive a position command, with the other set being a back-up. Nonetheless, if needed or desired, both sets of windings 224 could be simultaneously supplied with a position command. In either case, the armature 222 is responsive to the supplied position commands to move the jet pipe 218 to one of three discrete positions—a first control position, a second control position, or a third control position.

The jet pipe 218 includes an inlet port 226 and an outlet port 228. The inlet port 226 is in fluid communication with the servo fuel inlet 206, and thus receives a flow of servo fuel supplied from the servo control fuel source 102. The outlet port 228 is disposed adjacent the servo fuel outlet 208, the first servo fuel control pressure port 212, and the second servo fuel control pressure port 214, and discharges fuel supplied to the jet pipe 218. With this configuration, the jet pipe 218, based on its three discrete positions, establishes three different pressure states at the first and second servo fuel control pressure ports 212, 214. In the first control position, which is the position depicted in FIG. 2, pressure at the first servo fuel control pressure port 212 will be higher than the pressure at the second servo fuel control pressure port 214. In the second control position, which is the position depicted in FIG. 3, pressures at the first and second servo fuel control pressure ports 212, 214 will be at least substantially equal. And in the third control position, is the position depicted in FIG. 4, pressure at the second servo fuel control pressure port 214 will be higher than the pressure at the first servo fuel control pressure port 212. As will be described further below, it is in response to these three different pressure states that the flow-level select and shut-off valve 204 is positioned. Before describing how this is implemented, a description of flow-level select and shut-off valve 204 will be provided.

With reference again to FIG. 2, the flow-level select and shut-off valve 204 includes a control pressure inlet port 232, a first control pressure port 234, a second control pressure port 236, a first fuel inlet 238, a second fuel inlet 242, a return-to-tank fuel outlet port 244, and a valve element 246. The valve element 246 is a multi-diameter valve that includes at least a relatively larger head end 246-1, and a relatively smaller rod end 246-2. The rod end 246-2 consists of a double wall to form fluid passageway 246-3. The control pressure inlet port 232 supplies pressure to an annular chamber 235, that is defined by the valve body 112, the valve element head end 246-1, and the valve element rod end 246-2. The control pressure inlet port 232 is in fluid communication with the servo control fuel source 102 via a flow control orifice 233 and, at least in the depicted embodiment, is also in fluid communication with the servo fuel inlet 206. The first control pressure port 234 supplies pressure to a head end chamber 237 that is defined by the valve body 112 and the valve element 246. The first control pressure port 234 is coupled to and is in fluid communication with the first servo fuel control pressure port 212. The second control pressure port 236 is coupled to and is in fluid communication with the second servo fuel control pressure port 214. The first fuel inlet 238 is in fluid communication with the cold fuel return flow source 104, the second fuel inlet 242 is in fluid communication with the hot fuel return flow source 106, and the return-to-tank fuel outlet port 244 is in fluid communication with the fuel tank 110.

The valve element 246 is disposed within the valve body 112 and is movable to at least the shut-off position, the mid-flow position, and the max-flow position. In the shut-off position, which is the position depicted in FIG. 2, fuel is prevented from flowing into and through the first and second fuel inlets 238, 242 and out the return-to-tank outlet port 244. In the mid-flow position, which is the position depicted in FIG. 3, fuel may flow into and through the first and second fuel inlets 238, 242 and out the return-to-tank outlet port 244 at the first flow rate. In the max-flow position, which is the position depicted in FIG. 4, fuel may flow into and through the first and second fuel inlets 238, 242 and out the return-to-tank outlet port 244 at the second, greater flow rate.

Although the flow-level select and shut-off valve 204 may be variously configured to facilitate the first and second flow rates when the valve element 246 is moved to the mid-flow and max-flow positions, respectively, in the depicted embodiment the valve element 246 has a plurality of ports formed therein. More specifically, the valve element 246 has first and second cold fuel inlet ports 248-1, 248-2 and first and second hot fuel inlet ports 252-1, 252-2. Based on the position of the valve element 246, none, one, or both of the first and second cold fuel inlet ports 248-1, 248-2 may be selectively placed in fluid communication with the first fuel inlet 238 and the return-to-tank outlet port 244. Similarly, none, one, or both of the first and second hot fuel inlet ports 252-1, 252-2, may be selectively placed in fluid communication with the second fuel inlet 242 and the return-to-tank outlet port 244, based on the position of the valve element 246.

As depicted in FIG. 2, when the valve element 246 is in the shut-off position, the first and second cold fuel inlet ports 248-1, 248-2 are both fluidly isolated from the first fuel inlet 238 and the return-to-tank outlet port 244, and the first and second hot fuel inlet ports 252-1, 252-2 are both fluidly isolated from the second fuel inlet 242 and the return-to-tank outlet port 244. As depicted in FIG. 3, when the valve element 246 is in the mid-flow position, only the first cold fuel inlet port 248-1 is in fluid communication with the first fuel inlet 238 and the return-to-tank outlet port 244 via fluid passageway 246-3, and only the first hot fuel inlet port 252-1 is in fluid communication with the second fuel inlet 242 and the return-to-tank outlet port 244 via fluid passageway 246-3. As depicted in FIG. 4, when the valve element 246 is in the max-flow position, both the first and second cold fuel inlet ports 248-1, 248-2 are in fluid communication with the first fuel inlet 238 and the return-to-tank outlet port 244 via fluid passageway 246-3, and both the first and second hot fuel inlet ports 252-1, 252-2 are in fluid communication with the second fuel inlet 242 and the return-to-tank outlet port 244 via fluid passageway 246-3.

It was noted above that the flow-level select and shut-off valve 204 is positioned in response to the three different pressure states that are established at the first and second servo fuel control pressure ports 212, 214 of the servo valve 202. A more detailed discussion of how this takes place will now be provided. With reference once again to FIG. 2, which depicts the jet pipe 218 in the first control position, pressure at the first servo fuel control pressure port 212 is higher than the pressure at the second servo fuel control pressure port 214. As a result, pressure at the first control pressure port 234 is higher than the pressure at the second control pressure port 236. This results in a relatively high pressure in the head end chamber 237 acting on the valve element head end 246-1, a variable pressure in the annular chamber 235 acting on the annular area of valve element 246, and a relatively low pressure acting on the valve element rod end 246-2. This pressure state causes the valve element 246 to move to the shut-off position. Moving to FIG. 3, when the jet pipe 218 is in the second control position, pressures at the first and second servo fuel control pressure ports 212, 214 are at least substantially equal, and thus so are the pressures at the first and second control pressure ports 234, 236. This results in a relatively medium pressure in the head end chamber 237 acting on the valve element head end 246-1 area, a relatively higher pressure acting on the annular area of valve element 246, which is regulated by the flow control orifice 233 in conjunction with the resultant area formed by valve element 246 partially closing pressure port 236, and a relatively low pressure acting on the valve element rod end 246-2. This pressure state causes the valve element 246 to move to the mid-flow position. Finally, as depicted in FIG. 4, when the jet pipe 218 is in the third control position, the pressure at the second servo fuel control pressure port 214 is higher than the pressure at the first servo fuel control pressure port 212. Concomitantly, the pressure at the second control pressure port 236 is now higher than the pressure at the first control pressure port 234. This results in a relatively low pressure in head end chamber 237 acting on the valve element head end 246-1, a relatively high pressure acting on the annular area of valve element 246, and a relatively low pressure acting on the valve element rod end 246-2. This pressure state causes the valve element 246 to move to the max-flow position.

Before proceeding further, it is noted that the servo valve 202 configured such that the jet pipe 218 will move to the second control position whenever the torque motor 216 is deenergized. This ensures the FRV 108 will be moved to the mid-flow position in the unlikely event electrical power to the FRV 108 is unavailable. This is sometimes referred to as a "Fail Safe" position.

Proceeding now with the remainder of the description, the depicted FRV 108 additionally includes a first fuel pressure regulator valve 254, a second fuel pressure regulator valve 256, and a valve position sensor 258. The first fuel pressure regulator 254 is disposed upstream of the first fuel inlet 238, and the second fuel pressure regulator valve 256 is disposed upstream of the second fuel inlet 242. The first and second fuel pressure regulators 254, 256 are independent, and control the differential pressures across the first and second cold fuel inlet ports 248-1, 248-2 and the first and second hot fuel inlet ports 252-1, 252-2, respectively. This ensures accurate flows over a large range of pressures upstream from the pressure regulator valves.

The valve position sensor 258 is configured to sense the position of the FRV 108, and more specifically the valve element 246, and supply a valve position signal representative thereof. Although the valve position sensor 258 may be implemented using any one of numerous of position sensing devices, in the depicted embodiment it is implemented using a linear variable differential transformer (LVDT) position sensor. The valve position sensor 258 thus includes an outer housing 262 and a movable slug 264. The outer housing 262 is coupled to the valve body 112 and extends into the valve element 246, and houses a non-illustrated LVDT. The movable slug 264 engages the valve element 246, and is partially disposed within and is movable relative to the outer housing 262. A spring element 266 is provided in the depicted embodiment to load the movable slug 264 into engagement against the valve element 246, alleviating the need to fasten, weld, braze, or otherwise couple the movable slug 264 to the valve element 246. The spring element 266 also supplies a bias force to the valve element 246 that urges the valve element 246 against the seat 268 when no servo control fluid pressure is supplied to the FRV 108, such as during engine shutdown conditions. This ensures very little or no leakage through the FRV 108 to the fuel tank 110 when the engine is shut down. It should be noted that the spring element 266 is not relied upon to position the valve element 246, to any one of the three discrete positions during normal engine operational modes when servo fluid pressure is being supplied to the FRV 108.

The FRV 108 disclosed herein implements accurate metering and shut-off functions into a single valve with a single position sensor. The FRV 108 can be commanded to three discrete positions, using a relatively simple single stage servo valve that is commanded to three respective discrete positions, and does not rely on positioning springs or complex closed loop control logic during normal engine operating conditions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel return valve, comprising:
    a flow-level select and shut-off valve including a first fuel inlet, a second fuel inlet, a return-to-tank fuel outlet, a control pressure inlet port, a first control pressure port, a second control pressure port, and a valve element movable between a shut-off position, a mid-flow position, and a max-flow position; and
    a servo control valve coupled to the flow-level select and shut-off valve and configured to control relative fluid pressures therein to selectively move the valve element to the shut-off position, the mid-flow position, and the max-flow position,
    wherein the flow-level select and shut-off valve is configured such that:
        when the valve element is in the shut-off position, fuel is prevented from flowing into and through the first and second fuel inlet ports and out the return-to-tank outlet port,
        when the valve element is in the mid-flow position, fuel may flow into and through the first and second fuel inlets and out the return-to-tank outlet port at a first flow rate, and
        when the valve element is in the max-flow position, fuel may flow into and through the first and second fuel inlets and out the return-to-tank outlet port at a second flow rate that is greater than the first flow rate.

2. The fuel return valve of claim 1, wherein the servo control valve comprises:
    a servo fuel inlet;
    a servo fuel outlet;
    a first servo fuel control pressure port; and
    a second servo fuel control pressure port,
    wherein the servo control valve is configured to selectively control relative fluid pressures in the flow-level select and shut-off valve by controlling relative fluid pressures at the first and second servo fuel control pressure ports.

3. The fuel return valve of claim 1, wherein the servo control valve is an electrohydraulic servo valve (EHSV).

4. The fuel return valve of claim 1, further comprising:
    a first fuel pressure regulator valve disposed upstream of the first fuel inlet; and
    a second fuel pressure regulator valve disposed upstream of the second fuel inlet.

5. The fuel return valve of claim 1, wherein the valve element comprises:

first and second cold fuel inlet ports, one or both of the first and second cold fuel inlet ports selectively placed in fluid communication with the first fuel inlet and the return-to-tank outlet port, based on the position of the valve element; and first and second hot fuel inlet ports, one or both of the first and second cold fuel inlet ports selectively placed in fluid communication with the first fuel inlet and the return-to-tank outlet port, based on the position of the valve element.

6. The fuel return valve of claim 5, wherein:

when the valve element is in the shut-off position, the first and second cold fuel inlet ports are both fluidly isolated from the first fuel inlet and the return-to-tank outlet port, and the first and second hot fuel inlet ports are both fluidly isolated from the second fuel inlet and the return-to-tank outlet port;

when the valve element is in the mid-flow position, only the first cold fuel inlet port is in fluid communication with the first fuel inlet and the return-to-tank outlet port, and only the first hot fuel inlet port is in fluid communication with the second fuel inlet and the return-to-tank outlet port; and when the valve element is in the max-flow position, both the first and second cold fuel inlet ports are in fluid communication with the first fuel inlet and the return-to-tank outlet port, and both the first and second hot fuel inlet ports are in fluid communication with the second fuel inlet and the return-to-tank outlet port.

7. The fuel return valve of claim 1, further comprising:
a position sensor coupled to the flow-level select and shut-off valve and configured to sense a position thereof.

8. The fuel return valve of claim 7, wherein the position sensor comprises a linear variable differential transformer (LVDT).

9. A fuel return valve, comprising:
a servo control valve including a servo fuel inlet, a servo fuel outlet, a first servo fuel control pressure port, and a second servo fuel control pressure port, the servo control valve configured to selectively control relative fluid pressures at the first and second servo fuel control pressure ports;
a flow-level select and shut-off valve including first and second cold fuel inlet ports, first and second hot fuel inlet ports, a return-to-tank outlet port, a control pressure inlet port, a first control pressure port, a second control pressure port, and a valve element movable to at least a shut-off position, a mid-flow position, and a max-flow position, the control pressure inlet port in fluid communication with the servo fuel inlet, the first control pressure port coupled to and in fluid communication with the first servo fuel control pressure port, the second control pressure port coupled to and in fluid communication with the second servo fuel control pressure port,
wherein the flow-level select and shut-off valve is configured such that:
the valve element is in the shut-off position when the fluid pressure at the first servo fuel control pressure port is greater than the fluid pressure at the second servo fuel control pressure port, whereby the first and second cold fuel inlet ports and the first and second hot fuel inlet ports are both fluidly isolated from the return-to-tank outlet port,
the valve element is in the mid-flow position when the fluid pressure at the first servo fuel control pressure port is equal to the fluid pressure at the second servo fuel control pressure port, whereby only the first cold fuel inlet port and only the first hot fuel inlet port are in fluid communication with the return-to-tank outlet port, and
the valve element is in the max-flow position when the fluid pressure at the first servo fuel control pressure port is less than the fluid pressure at the second servo fuel control pressure port, whereby both the first and second cold fuel inlet ports and both the first and second hot fuel inlet ports are in fluid communication with the return-to-tank outlet port.

10. The fuel return valve of claim 9, wherein the servo control valve is an electrohydraulic servo valve (EHSV).

11. The fuel return valve of claim 9, further comprising:
a linear variable differential transformer (LVDT) position sensor coupled to the valve element and configured to sense a position thereof.

12. The fuel return valve of claim 9, wherein the first and second cold fuel inlet ports and first and second hot fuel inlet ports are formed in the valve element.

13. The fuel return valve of claim 12, further comprising:
a first fuel inlet disposed upstream of, and in fluid communication with, the first and second cold fuel inlet ports; and
a second fuel inlet disposed upstream of, and in fluid communication with, the first and second hot fuel inlet ports.

14. The fuel return valve of claim 13, further comprising:
a first fuel pressure regulator valve disposed upstream of the first fuel inlet; and
a second fuel pressure regulator valve disposed upstream of the second fuel inlet.

15. A fuel return flow control system, comprising:
a servo control fuel source;
a cold fuel return flow source;
a hot fuel return flow source; and
a fuel return valve in fluid communication with the servo control fuel source, the cold fuel return flow source, and the hot fuel return flow source, the fuel return valve comprising:
an electrohydraulic servo control valve including a servo fuel inlet, a servo fuel outlet, a first servo fuel control pressure port, and a second servo fuel control pressure port, the servo fuel inlet in fluid communication with the servo control fuel source, the electrohydraulic servo control valve configured to selectively control relative fuel pressures at the first and second servo fuel control pressure ports; and
a flow-level select and shut-off valve including first and second cold fuel inlet ports, first and second hot fuel inlet ports, a return-to-tank fuel outlet port, a control pressure inlet port, a first control pressure port, a second control pressure port, and a valve element movable to at least a shut-off position, a mid-flow position, and a max-flow position, the control pressure inlet port in fluid communication with the servo control fuel source, the first control pressure port coupled to and in fluid communication with the first servo fuel control pressure port, the second control pressure port coupled to and in fluid communication with the second servo fuel control pressure port, the first and second cold fuel inlet ports in fluid communication with the cold fuel return flow source, and the first and second hot fuel inlet ports in fluid communication with the hot fuel return flow source,
wherein the flow-level select and shut-off valve is configured such that:
the valve element is in the shut-off position when the fuel pressure at the first servo fuel control pressure port is greater than the fuel pressure at the second servo fuel control pressure port, whereby the first and second cold fuel inlet ports and the first and second hot fuel inlet ports are both fluidly isolated from the return-to-tank fuel outlet port, the valve element is in the mid-flow position when the fuel pressure at the first servo fuel control pressure port is equal to the fuel pressure at the second servo fuel control pressure port, whereby only the first cold fuel inlet port and only the first hot fuel inlet port are in fluid communication with the return-to-tank fuel outlet port, and the valve element is in the max-flow position when the fuel pressure at the first servo fuel control pressure port is less than the fuel pressure at the second servo fuel control pressure port, whereby both the first and second cold fuel inlet ports and both the first and second hot fuel inlet ports are in fluid communication with the return-to-tank fuel outlet port.

16. The fuel return flow control system of claim 15, wherein the first and second cold fuel inlet ports and first and second hot fuel inlet ports are formed in the valve element.

17. The fuel return flow control system of claim 15, further comprising:

a linear variable differential transformer (LVDT) position sensor coupled to the valve element and configured to sense a position thereof.

18. The fuel return flow control system of claim 15, further comprising:

a first fuel inlet disposed upstream of, and in fluid communication with, the first and second cold fuel inlet ports; and a second fuel inlet disposed upstream of, and in fluid communication with, the first and second hot fuel inlet ports.

19. The fuel return flow control system claim 18, further comprising:

a first fuel pressure regulator valve disposed upstream of the first fuel inlet; and a second fuel pressure regulator valve disposed upstream of the second fuel inlet.

* * * * *